United States Patent [19]

Wayman

[11] 4,302,981

[45] Dec. 1, 1981

[54] LONGITUDINAL DRIVE MECHANISMS

[75] Inventor: William G. Wayman, New Barnet, England

[73] Assignee: Crosfield Electronics Limited, London, England

[21] Appl. No.: 129,771

[22] Filed: Mar. 12, 1980

[30] Foreign Application Priority Data

Mar. 20, 1979 [GB] United Kingdom ............... 09727/79

[51] Int. Cl.³ ...................... F16H 27/02; F16H 29/02
[52] U.S. Cl. ............................... 74/89.15; 74/424.8 R
[58] Field of Search ........ 74/89.15, 424.8 R, 424.8 B, 74/424.8 VZ

[56] References Cited

U.S. PATENT DOCUMENTS 3,464,283  9/1969  Miller et al. .................. 74/424.8 R
3,977,262  8/1976  Randolph .......................... 74/89.15
4,089,233  5/1978  Sebald ........................... 74/424.8 A

FOREIGN PATENT DOCUMENTS 52-46261  4/1977  Japan ........................... 74/424.8 R Primary Examiner—Lawrence J. Staab
Attorney, Agent, or Firm—Sughrue, Mion, Zinn, Macpeak and Seas

[57] ABSTRACT

Longitudinal drive mechanisms are usually provided in combination with a component (17) of a machine which is mounted on a slide way to move the component along the slide way. Such mechanisms usually include a nut (2) running along a screwthreaded shaft or leadscrew (1) and any deviations from staightness or any discrepancies in the pitch of the leadscrew (1) cause extraneous or irregular movement of the component (17) along the slideway. By including a first pair of links (4) pivotally connected to the nut (2) and to a collar (3) and a second pair of links (7 and 8) pivotally connected to the collar (3) and the component (17) inaccuracies in the leadscrew (1) are absorbed by the pivoted links and so not transferred to the component (17).

3 Claims, 1 Drawing Figure

U.S. Patent  Dec. 1, 1981  4,302,981
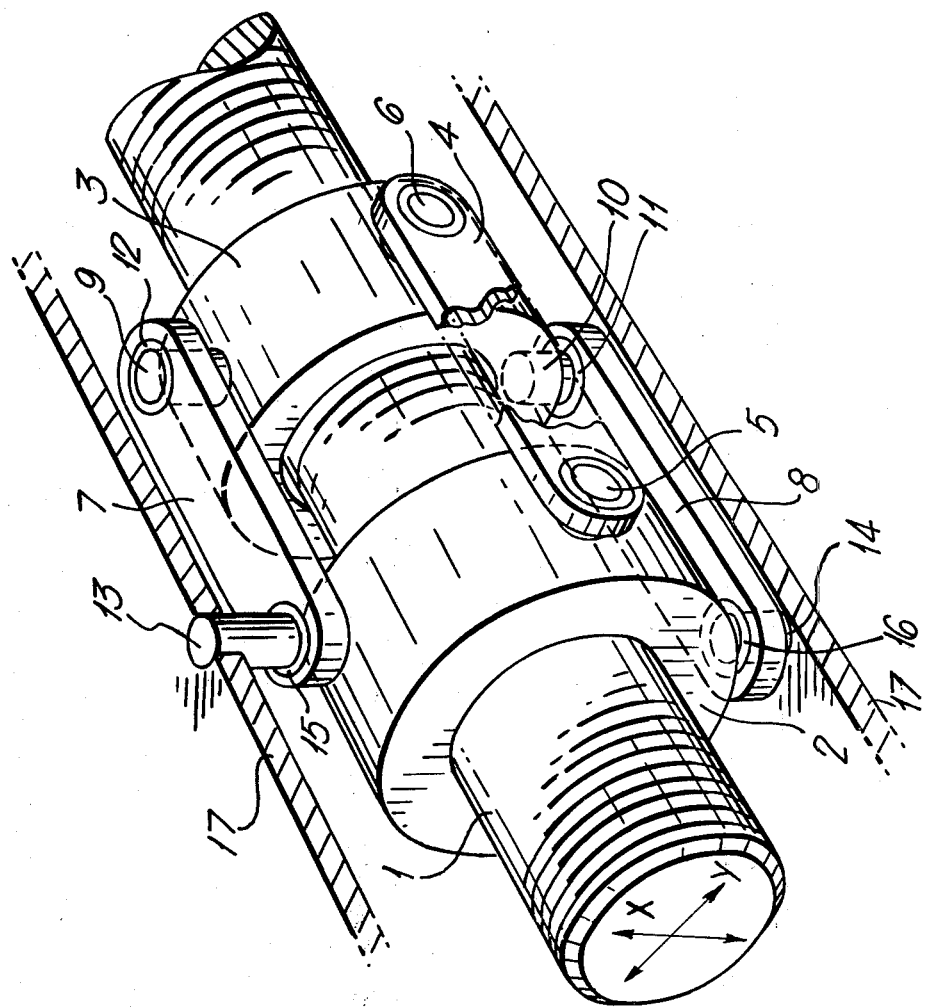

LONGITUDINAL DRIVE MECHANISMS

Longitudinal drive mechanisms are usually provided in combination with a component of a machine which is mounted on a slideway. The longitudinal drive mechanism moves the component along the slideway and they are often used in precision machine tools, for example, a centre lathe. Another example of the use of a longitudinal drive mechanism is in an image scanner in which the longitudinal drive mechanism is used to drive the scanning head in the axial direction with respect to the image to be scanned which is mounted on a locating cylinder.

The longitudinal drive mechanisms conventionally include a screwthreaded shaft, or leadscrew, mounted in thrust bearings for rotation in either direction and a nut fitted on the leadscrew and being prevented from rotating with respect to the leadscrew so that, as the leadscrew rotates the nut moves in an axial direction along the leadscrew. The nut is connected to a driver or is connected directly to the component to be moved. Errors and inaccuracies in the leadscrew result in extraneous and irregular movements of the driver or the component being moved. Any deviation from straightness of the leadscrew results in the nut moving in a direction transverse to the axis of the leadscrew and this transverse movement is transferred to the component to be moved. Further, any discrepancies in the pitch of the leadscrew result in a change in its pitch angle and result in a tilting movement of the nut as it passes along the leadscrew. This tilting movement is also transferred to the component to be moved and, usually, the component to be moved is rigidly connected to the nut and this rigid connection between the two can often lead to any inaccuracies in the leadscrew being amplified by this connection so that, for example, any tilting of the nut, results in an axial movement of the component.

Thus, the accuracy of the movement which can be achieved using such a longitudinal drive mechanism is entirely dependent upon the accuracy with which the leadscrew and the nut are formed. It is difficult to manufacture the leadscrew and the nut to the required degree of accuracy and, in any event, it is very expensive to manufacture such components to high degrees of tolerance.

According to this invention a longitudinal drive mechanism includes a leadscrew, a nut in engagement with the leadscrew and arranged to move axially along the leadscrew upon its rotation, a first pair of links having their one ends pivotally connected to the nut with a common pivot axis and their other ends pivotally connected to a collar with a common pivot axis, a second pair of links having their one ends pivotally connected to the collar with a common pivot axis and their other ends pivotally connected to a driver with a common pivot axis, the collar loosely surrounding the leadscrew and the pivot axes of the first and second pair of links on the collar being orthogonal to one another.

The provision of the two pairs of pivoted links enables any inaccuracies in the leadscrew in a direction transverse to its axis to be accommodated by allowing the nut to move freely in all directions in the plane normal to the axis of the leadscrew whilst no corresponding movement occurs on the driver. The pivoted links also enables any tilting movement of the nut to be accommodated without this tilting movement being transferred to the driver.

Preferably the common pivot axes of the first and second pair of links on the collar lay in the same plane. It is also preferred that the distance between the pivots of the first and second pairs of links in the axial direction of the leadscrew is substantially the same.

The pivots between the links and the nut, the collar and the driver may be arranged to provide the reaction force to prevent the nut rotating with the leadscrew and, when so arranged, it is preferred that the pivotal connections have a considerable extent in a plane normal to the axis of the leadscrew. Preferably each pivotal connection includes at least one rolling contact bearing and preferably these bearings are formed by needle roller bearings or taper roller bearings.

When the moving component is subject to high loads a separate torque restraint may be provided. The torque restraint may include an arm fixed to the nut and arranged to bear on the moving component or on a bearing track arranged parallel to the leadscrew. In this case the arm and nut are preferably arranged to take up any backlash present.

There must always be some clearance between the inside of the collar and the leadscrew since, to accommodate the inaccuracies in the leadscrew the collar moves in a plane normal to the axis of the leadscrew. The size of the clearance between the inside of the collar of the leadscrew depends upon the degree of accuracy of the leadscrew and the nut. The greater the tolerance in these two components, the greater the clearance that has to exist between the inside of the collar and the outside of the leadscrew.

The nut may include a plain female screwthread which is complementary to that on the leadscrew or, alternatively, the nut may include a recirculatory ball-type bearing in which the balls recirculate inside the nut and engage in the trough of the screwthread on the leadscrew.

A particular example of a longitudinal drive mechanism in accordance with this invention is shown in the accompanying drawing which is a partly cut away perspective view.

The drive mechanism comprises a leadscrew 1 rotatably mounted at opposite ends in thrust bearings (not shown) and provided with a rotary drive assembly which is also not shown. A nut 2 having a complementary female screwthread is threaded onto the leadscrew 1 and is arranged so that, on rotation of the leadscrew 1, the nut 2 moves axially along the leadscrew 1. A collar 3 loosely surrounds the leadscrew 1 and is connected to the nut 2 by a pair of links 4 which are pivotally connected to the nut 2 and the collar 3 by needle roller bearings mounted on pins 5 and 6 extending outwardly from the nut 2 and the collar 3 respectively.

The collar 3 is also pivotally connected to another pair of links 7 and 8 by pins 9 and 10 and needle roller bearings 12 and 11 respectively. The axes of the pins 6, 9 and 10 all lie in the same plane and a common axis of the pins 6 is perpendicular to the common axis of the pins 9 and 10.

The other end of the links 7 and 8 are pivotally connected to pins 13 and 14 by needle roller bearings 15 and 16 and the pins 13 and 14 are carried by a driver 17. The driver 17 forms part of, or is attached to, the component of the machine to be driven in the axial direction of the leadscrew 1.

Any deviation from straightness of the leadscrew 1 results in movement of the leadscrew 1 and the nut 2 in a plane normal to the axis of the leadscrew 1 i.e. in the directions X and Y as shown in the drawing. When the inaccuracy results in the nut 2 moving in the direction X, the links 4 pivoting about the pins 5 and 6 accommodate this movement with the collar 3 and the links 7 and 8 remaining substantially stationary. Any movement of the nut 2 in the Y direction results in a corresponding movement of the links 4 and the collar 3 in the Y direction causing the links 7 and 8 to pivot around the pins 9, 10 and 13, 14. Any tilting motion of the nut 2 results in the nut 2 rotating about the pin 5 or, alternatively in the nut 2 the links 4 and the collar 3, all tilting and the links 7 and 8 pivoting about the pins 13 and 14. Thus, all of these movements are accommodated by the linkage between the nut 2 and the driver 17 and thus, these inaccuracies in the leadscrew 1 are accommodated by the linkage without any of them being passed on to the driver 17.

I claim:

1. A longitudinal drive mechanism, comprising: a leadscrew (1), a nut (2), said nut being in screwthreaded engagement with said leadscrew whereby it moves axially along said leadscrew upon rotation of said leadscrew, a collar (3), a first pair of links (4), one end of each of said first pair of links being pivotally connected to said nut with a common pivot axis (5), the other end of each of said first pair of links being pivotally connected to said collar with a common pivot axis (6), a driver (17), and a second pair of links (7, 8), one end of each of said second pair of links being pivotally connected to said collar with a common pivot axis (9, 10) and the other end of each of said second pair of links being pivotally connected to said driver with a common pivot axis (13, 14), said collar loosely surrounding said leadscrew, said common pivot axes of said other ends of said first pair of links and of said one ends of said second pair of links being orthogonal to one another and lying in the same plane, the distance between the pivots of said first and second pairs of links in the axial direction of said leadscrew being substantially the same and said common pivot axes of said other ends of said second pair of links and of said one ends of said first pair of links also lying in a common plane.

2. The longitudinal drive mechanism of claim 1, wherein each of said pivotal connections includes at least one rolling contact bearing formed by one of a group consisting of needle roller bearings and tapered roller bearings.

3. The longitudinal drive mechanism of claims 1 or 2, wherein said nut includes a plain female screwthread which is complementary to and in engagement with that on said leadscrew.

* * * * *